(12) United States Patent
Nagata et al.

(10) Patent No.: US 9,532,367 B2
(45) Date of Patent: Dec. 27, 2016

(54) RADIO BASE STATION, USER TERMINAL, RADIO COMMUNICATION METHOD AND RADIO COMMUNICATION SYSTEM

(71) Applicant: NTT DOCOMO, INC., Tokyo (JP)

(72) Inventors: Satoshi Nagata, Tokyo (JP); Xiang Yun, Beijing (CN); Yu Jiang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 121 days.

(21) Appl. No.: 14/384,451

(22) PCT Filed: Mar. 12, 2013

(86) PCT No.: PCT/JP2013/056716
§ 371 (c)(1),
(2) Date: Sep. 11, 2014

(87) PCT Pub. No.: WO2013/137218
PCT Pub. Date: Sep. 19, 2013

(65) Prior Publication Data
US 2015/0109985 A1    Apr. 23, 2015

(30) Foreign Application Priority Data

Mar. 16, 2012 (JP) .................................. 2012-060788

(51) Int. Cl.
*H04W 72/08* (2009.01)
*H04B 7/02* (2006.01)
(Continued)

(52) U.S. Cl.
CPC ........... *H04W 72/085* (2013.01); *H04B 7/024* (2013.01); *H04B 7/0623* (2013.01);
(Continued)

(58) Field of Classification Search
CPC .................................................. H04W 72/085
See application file for complete search history.

(56) References Cited

U.S. PATENT DOCUMENTS

| | | | |
|---|---|---|---|
| 2009/0196237 A1* | 8/2009 | Jonsson | H04L 1/0033 370/329 |
| 2010/0014430 A1* | 1/2010 | Oka | H04L 1/1854 370/242 |

(Continued)

FOREIGN PATENT DOCUMENTS

KR    2011-0035807 A    4/2011

OTHER PUBLICATIONS

Office Action issued in corresponding Japanese application No. 2012-060788, mailed Oct. 6, 2015 (6 pages).
(Continued)

*Primary Examiner* — Brian D Nguyen
*Assistant Examiner* — Toan Nguyen
(74) *Attorney, Agent, or Firm* — Osha Liang LLP

(57) ABSTRACT

The present invention is designed to prevent the decrease of throughput and also reduce the overhead of CSI feedback when CoMP transmission is applied. A radio base station is configured to be able to perform coordinated multiple-point transmission/reception with a user terminal, and includes a detection section configured to detect a retransmission control signal fed back from the user terminal, and a CQI updating section configured to update a CQI for coordinated multiple-point transmission/reception using received quality information in each cell, and the CQI updating section updates the CQI using a calculating formula that is defined with the received quality information in each cell and a variable which changes the value depending on the content of the retransmission control signal.

11 Claims, 9 Drawing Sheets

(51) Int. Cl.
   *H04B 7/06*      (2006.01)
   *H04L 1/00*      (2006.01)
   *H04W 72/00*     (2009.01)
   *H04L 1/16*      (2006.01)

(52) U.S. Cl.
   CPC ......... *H04B 7/0632* (2013.01); *H04L 1/0026* (2013.01); *H04L 1/0039* (2013.01); *H04L 1/1657* (2013.01); *H04W 72/005* (2013.01); *H04L 1/1607* (2013.01)

(56)             References Cited

U.S. PATENT DOCUMENTS

2010/0157829 A1* 6/2010 Jonsson ............... H04L 1/0026
                                                    370/252
2011/0243191 A1* 10/2011 Nakao .................. H04B 1/7143
                                                    375/133
2012/0063382 A1* 3/2012 Seki ..................... H04L 1/1887
                                                    370/312
2012/0188904 A1   7/2012 Koo et al.

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

NTT Docomo; "CSI Feedback Scheme for JT CoMP;" 3GPP TSG RAN WG1 Meeting #66bis, R1-113292; Zhuhai, China; Oct. 10-14, 2011 (9 pages).

International Search Report for corresponding International Application No. PCT/JP2013/056716, mailed Jun. 18, 2013 (1 page).

Extended Search Report issued in corresponding European Application No. 13760310.6, mailed Aug. 19, 2015 (7 pages).

* cited by examiner

| CHANNEL | | PRECODER | | |
|---|---|---|---|---|
| $H_1$ | $H_2$ | $W_1$ | $W_2$ | $ICI+N_0$ |
| [1,1] | [−0.5,−0.5] | $[1,1]^H$ | $[1,1]^H$ | 0.5 |

FIG.4A

| PHASE(i) | $\theta_0$ | $\theta_1$ | $\theta_2$ | $\theta_3$ |
|---|---|---|---|---|
| CQI1 | 2 | | | |
| CQI2 | 18 | | | |
| $CQI_{Aggre.}$ | 2 | 10 | 18 | 10 |
| $CQI_{Update}$ | 18 | 10 | 2 | 10 |

FIG.4B

RADIO BASE STATION, USER TERMINAL, RADIO COMMUNICATION METHOD AND RADIO COMMUNICATION SYSTEM

TECHNICAL FIELD

The present invention relates to, a radio base station, a user terminal, a radio communication method and a radio communication system that are applicable to a cellular system and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, a transmission rate of maximum approximately 2 Mbps can be achieved on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, LTE advanced (LTE-A)).

Also, in a system of an LTE scheme, a user terminal reports the channel state to allow a radio base station to perform optimal scheduling. As a parameter for reporting this channel state, downlink quality information (CQI: Channel Quality Indicator) for use in adaptive modulation/demodulation and coding process (AMC: Adaptive Modulation and Coding scheme) is defined. Scheduling is executed by feeding back channel state information (CSI) including this CQI from the user terminal to the radio base station.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

Now, as a promising technique for further improving the system performance of an LTE system, there is inter-cell orthogonalization. For example, in an LTE-A system, intra-cell orthogonalization is made possible by orthogonal multiple access on both the uplink and the downlink. That is to say, on the downlink, orthogonalization is provided between user terminal UEs (User Equipments) in the frequency domain. On the other hand, between cells, like in W-CDMA, interference randomization by one-cell frequency reuse is fundamental.

So, in the 3GPP (3rd Generation Partnership Project), coordinated multiple-point transmission/reception (CoMP) techniques are under study as techniques for realizing inter-cell orthogonalization. In this CoMP transmission/reception, a plurality of cells coordinate and perform signal processing for transmission and reception for one user terminal UE or for a plurality of user terminal UEs. For example, on the downlink, simultaneous transmission of a plurality of cells adopting precoding, coordinated scheduling/beam forming, and so on are under study. By applying these CoMP transmission/reception techniques, improvement of throughput performance is expected, especially with respect to user terminal UEs located on cell edges.

To apply CoMP transmission/reception techniques, it is necessary to feed back channel state information (for example, CQI) for each of a plurality of cells from a user terminal to a radio base station. Also, the radio base station calculates CQI for CoMP using the CQI of each cell fed back from the user terminal, and updates the CoMP CQI information to apply in the radio base station.

To improve the accuracy of CoMP CQI that is calculated in the radio base station, although there is a method of feeding back various pieces of information from the user terminal, in this case, the overhead of CSI feedback increases. Meanwhile, although it is possible to reduce the overhead by making the amount of information to feed back from the user terminal smaller, the accuracy of CoMP CQI calculated in the base station apparatus lowers, and therefore it is not possible to apply CoMP transmission/reception techniques effectively, and consequently throughput cannot be improved.

The present invention has been made in view of the above, and it is therefore an object of the present invention to provide a radio base station, a user terminal, a radio communication method and a radio communication system that can prevent the amount of feedback information from increasing and also prevent throughput from decreasing when CoMP transmission is applied.

Solution to Problem

The radio base station of the present invention is a radio base station that is configured to be able to perform coordinated multiple-point transmission/reception with a user terminal, and this radio base station has: a detection section configured to detect a retransmission control signal fed back from the user terminal; and a CQI updating section configured to update a CQI for coordinated multiple-point transmission/reception using received quality information in each cell, and, in this radio base station, the CQI updating section updates the CQI using a calculating formula that is defined with the received quality information in each cell and a variable which changes the value depending on the content of the retransmission control signal.

Advantageous Effects of Invention

According to the present invention, it is possible to prevent the amount of feedback information from increasing and also prevent throughput from decreasing when CoMP transmission is applied.

BRIEF DESCRIPTION OF DRAWINGS

FIG. 4 provides diagrams to explain a method of determining phase difference information (θ) between cells when coherent JT-type CoMP is applied;

DESCRIPTION OF EMBODIMENTS

Now, an embodiment of the present invention will be described below in detail with reference to the accompanying drawings.

Figure 1A:
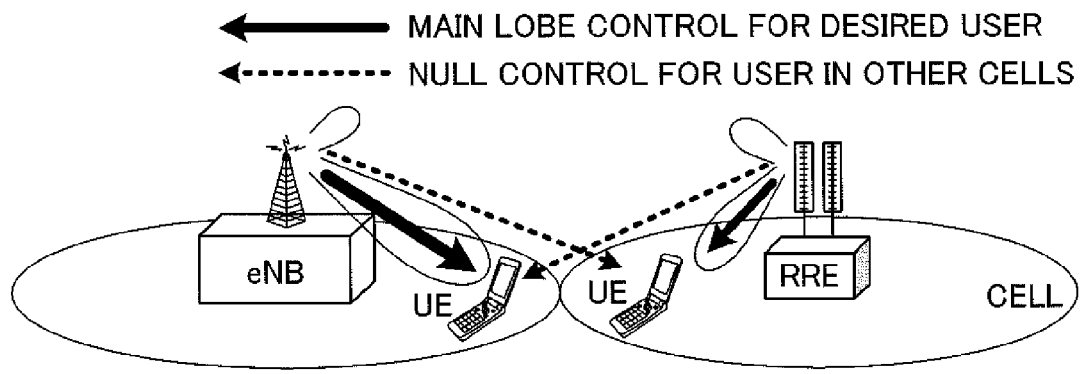
FIG. 1 provides diagrams to explain coordinated multiple-point transmission.
Figure 1B:
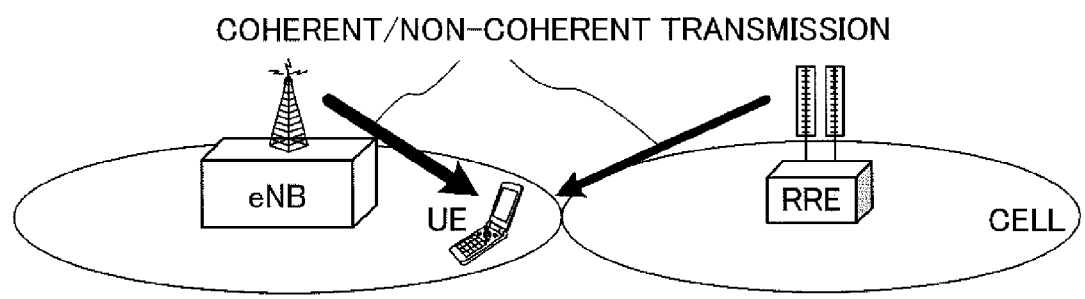
Figure 1C:
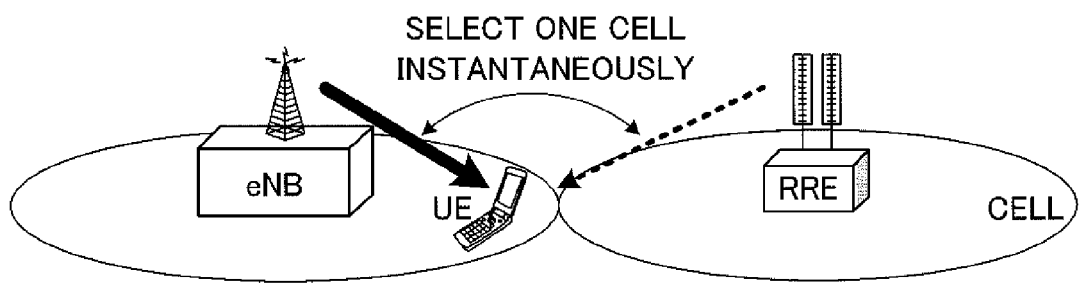

First, downlink CoMP transmission will be described using FIG. 1. Downlink CoMP transmission includes coordinated scheduling/coordinated beamforming, and joint processing. Coordinated scheduling/coordinated beamforming refers to the method of transmitting a shared data channel to one user terminal UE from only one cell, and, as shown in FIG. 1A, allocates radio resources in the frequency/space domain, taking into account interference from other cells and interference against other cells. Meanwhile, joint processing refers to the method of transmitting a shared data channel from a plurality of cells, at the same time, by applying precoding, and includes joint transmission (JT) to transmit a shared data channel from a plurality of cells to one user terminal UE as shown in FIG. 1B, and dynamic point selection (DPS) to select one cell instantaneously and transmit a shared data channel as shown in FIG. 1C.

Figure 2A:
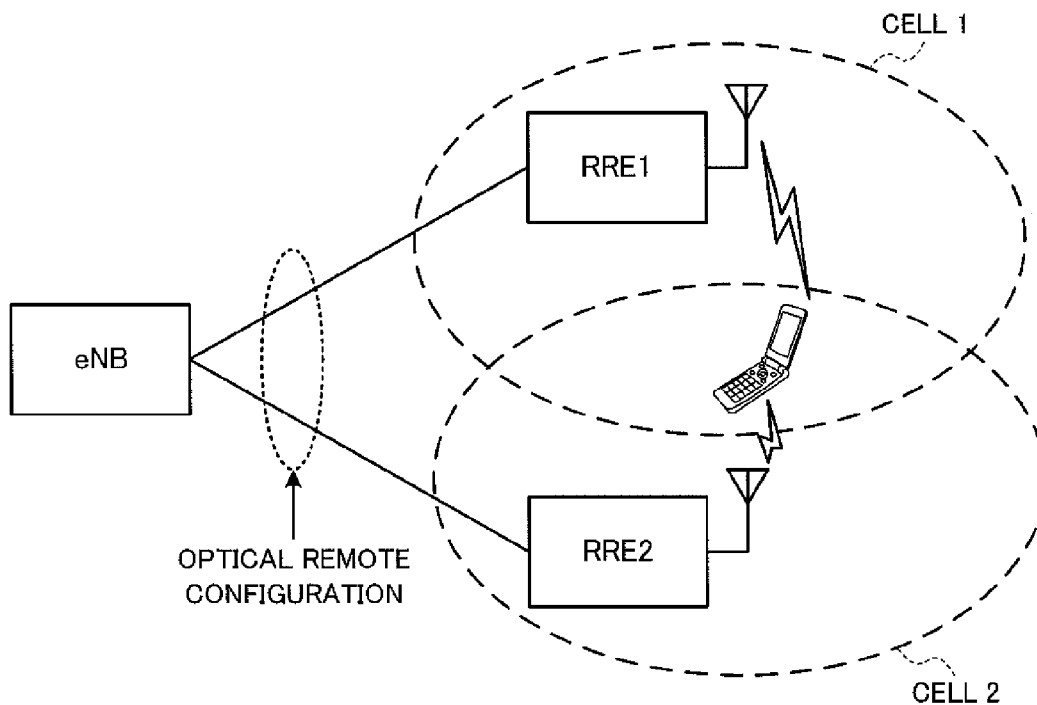
FIG. 2 provides schematic diagrams to show configurations of radio base stations that are adopted in coordinated multiple-point transmission/reception.
Figure 2B:
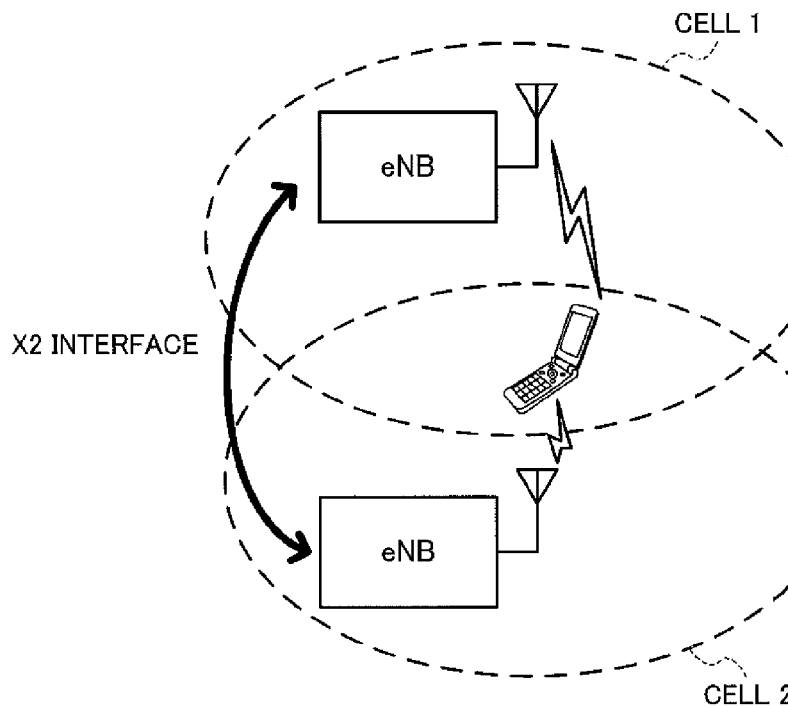

As for the configuration to implement CoMP transmission/reception, there are, for example, a configuration (centralized control based on an RRE configuration) to include a plurality of remote radio equipment (RREs) that are connected with a radio base station (radio base station eNB) by optical fiber and so on as shown in FIG. 2A, and a configuration (autonomous distributed control based on an independent base station configuration) of a radio base station (radio base station eNB) as shown in FIG. 2B. Note that although FIG. 2A shows a configuration to include a plurality of remote radio equipment RREs, it is equally possible to use a configuration to include only single remote radio equipment RRE, as shown in FIG. 1.

In the configuration shown in FIG. 2A (RRE configuration), remote radio equipment RRE 1 and RRE 2 are controlled in a centralized fashion in a radio base station eNB. In the RRE configuration, the radio base station eNB (central base station) that performs baseband signal processing and control for a plurality of remote radio equipment RREs, and each cell (that is, each remote radio equipment RRE) are connected by baseband signals using optical fiber, so that it is possible to execute radio resource control between the cells in the central base station altogether. That is, the problems of signaling delay and overhead between radio base station eNBs, which become problems in an independent base station configuration, are insignificant, and high-speed radio resource control between cells becomes relatively easy. Consequently, in the RRE configuration, it is possible to apply a method to use fast signal processing between cells such as simultaneous transmission of a plurality of cells, to the downlink.

On the other hand, in the configuration shown in FIG. 2B (independent base station configuration), a plurality of radio base station eNBs (or RREs) each perform radio resource allocation control such as scheduling. In this case, timing information and radio resource allocation information such as scheduling are transmitted to one radio base station eNB, if necessary, using the X2 interface between the radio base station eNB of cell 1 and the radio base station eNB of cell 2, for coordination between the cells.

When CoMP transmission is applied, a radio base station needs to calculate CQI for CoMP using received quality information in each CoMP cell and update the CoMP CQI information that is applied in the radio base station. The received quality information may be, for example, quantized quality information (CQI) that is generated in a user terminal and fed back to the radio base station, the SINR (Signal to Interference plus Noise Ratio) in each cell, and so on. With the present embodiment, any of these may be applied as received quality information, and "CQI" will be used as received quality information in the following description.

Now, in the above-described joint transmission (JT)-type CoMP, the same data is transmitted from the radio base stations of individual cells to a user terminal at the same time. Also, as for JT-type CoMP, there are non-coherent-type JT (non-coherent JT) to calculate CoMP CQI without considering phase difference information (θ) between cells, and coherent-type JT (coherent JT) to calculate CoMP CQI considering phase difference information (θ) between cells.

In non-coherent-type JT, CQI for CoMP (hereinafter referred to as "$CQI_{JT}$") is calculated using received quality information (for example, CQI 1 and CQI 2) in a plurality of cells (for example, two cells), and $CQI_{JT}$ information is updated. For example, allowing a radio base station to calculate $CQI_{JT}$ by applying following equation 1 based on CQI 1 and CQI 2 in each cell is under study.

[Formula 1]

$$CQI_{JT} = CQI1 + CQI2 \quad \text{(Equation 1)}$$

CQI 1: received quality information in the CoMP cell where received power is the strongest; and CQI 2: received quality information in the CoMP cell where received power is the second strongest.

Note that CQI 1 and CQI 2 here may be defined as, for example, the SINR of the CoMP cell where received power is the strongest and the SINR of the CoMP cell where received power is the second strongest, respectively. Also, interference from outside the CoMP coordinated cells may be used as the interference signal power in the SINR. Obviously, it is equally possible to use CQIs that are fed back from the user terminal.

When calculating $CQI_{JT}$ by applying above equation 1, phase difference information between cells is not taken into account. Consequently, when the phase difference between CQI 1 and CQI 2 in each cell is significant, inaccurate $CQI_{JT}$ (an under-evaluated value) is calculated in the radio base station. As a result of this, there is a threat of lowered throughput. On the other hand, to correct phase differences between cells, a method to apply a calculating formula defining the correction value as shown in following equation 2 may be used.

[Formula 2]

$$CQI_{JT}=CQI1+CQI2+2*\sqrt{CQI1*CQI2} \qquad \text{(Equation 2)}$$

However, a study by the present inventors has found out that, even when $CQI_{JT}$ is calculated by applying above equation 2, which takes into account the influence of phase differences between cells, cases still occur where inaccurate $CQI_{JT}$ (an over-evaluated value) is calculated in the radio base station.

Meanwhile, to improve the accuracy of the calculation value of $CQI_{JT}$ in the base station apparatus, although it may be possible to calculate an aggregated value ($CQI_{aggregated}$) of each cell's CQI (for example, CQI 1 and CQI 2) in a user terminal and feed back this aggregated value ($CQI_{aggregated}$) to the radio base station, increased CSI feedback overhead might still pose a problem.

So, the present inventors have studied this, and found out that there is a correlation between the accuracy of $CQI_{JT}$ calculated in a radio base station and the results of retransmission control signals fed back from a user terminal. To be more specific, when $CQI_{JT}$ that is calculated in a radio base station is an over-evaluated one, the retransmission control signal is a NACK, and, when $CQI_{JT}$ that is calculated in the radio base station is an under-evaluated one (or one of adequate evaluation), the retransmission control signal is an ACK. So, the present inventors have conceived of applying a calculating formula that is defined with received quality information in each cell and a variable which changes its value depending on the content of the retransmission control signal, as the method of calculating/updating $CQI_{JT}$, and arrived at the present invention.

Also, in coherent-type JT, $CQI_{JT}$ is calculated and updated using phase difference information (θ) between cells fed back from a user terminal, in addition to the received quality information of each cell (for example, CQI 1 and CQI 2). That is, since $CQI_{JT}$ is calculated taking into account phase difference information, it may be possible to calculate $CQI_{JT}$ accurately compared to non-coherent JT.

In this case, a user terminal determines phase difference information (θ) such that the aggregated value ($CQI_{aggregated}$) of each cell's CQI is maximized, and feeds back this phase difference information to a radio base station. However, according to a study by the present inventors, even when $CQI_{JT}$ is calculated by applying phase difference information that maximizes the aggregated value ($CQI_{aggregated}$) of each cell's CQI, cases might still occur where inaccurate $CQI_{JT}$ is calculated and throughput decreases. So, the present inventors have found out that $CQI_{JT}$ can be updated more accurately by determining, in the user terminal, phase difference information considering the maximum value of the aggregated value ($CQI_{aggregated}$) of quality information in each cell and the calculation value of $CQI_{JT}$.

Now, the method of updating $CQI_{JT}$ when non-coherent JT-type CoMP is applied, and the method of determining phase difference information (θ) and updating $CQI_{JT}$ when coherent JT-type CoMP is applied will be described below in detail. Note that, although a method of executing CoMP transmission between two cells will be described with the following description, the present embodiment is equally applicable to cases of executing CoMP transmission between three or more cells.

(Non-Coherent JT)

When non-coherent ST-type CoMP is applied, a radio base station calculates and updates $CQI_{JT}$ using a calculating formula which includes the CQI of each cell (here, CQI 1 and CQI 2) and a parameter that varies in accordance with the content of the retransmission control signal. For example, the radio base station calculates $CQI_{JT}$ using following equation 3, in which a variable (β), which changes the value depending on the content of the retransmission control signal (ACK/NACK), is defined.

[Formula 3]

$$CQI_{JT}=CQI1+CQI2+\beta*\sqrt{CQI1*CQI2} \qquad \text{(Equation 3)}$$

CQI 1: received quality information in the CoMP cell where received power is the strongest;

CQI 2: received quality information in the CoMP cell where received power is the second strongest; and β: variable In this way, in equation 3, a binomial theorem for applying correction when calculating the sum of the two vector values of CQI 1 and CQI 2 is multiplied by a variable β. As for β in above equation 3, it is possible to set a predetermined value (for example, 2) as the initial value, and change the value of β in accordance with the content of the retransmission control signal. At this time, it is possible to set in advance the range of candidate values which β might assume. For example, it is possible to set the range of variation (Δβ), through which β may be changed, to 0.5, and change β in the range of −2.0 to 4.0 ([−2, −1.5, −1.0, . . . , 4.0]) in accordance with the content of the retransmission control signal. Also, a method of multiplying the entire right-side part of the above equation by the variable β is possible.

When the retransmission control signal fed back from a user terminal is an "ACK," the radio base station decides that $CQI_{JT}$ that is set in the radio base station is under-evaluated (or adequate), and raises (or maintains) the value of β. On the other hand, when the retransmission control signal fed back from the user terminal is a "NACK," the radio base station decides that $CQI_{JT}$ that is set in the radio base station is over-evaluated (or adequate), and lowers the value of β.

For example, the radio base station sets the initial value of β to "2," and, when the retransmission control signal fed back from a user terminal is an "ACK," the radio base station raises the value of β from 2 to 2.5, calculates $CQI_{JT}$, and updates the $CQI_{JT}$ information. On the other hand, when the retransmission control signal fed back from a user terminal is a "NACK," the radio base station lowers the value of β from 2 to 1.5, calculates $CQI_{JT}$, and updates the $CQI_{JT}$ information.

Note that the radio base station may be configured to change the value of β in accordance with the content of one retransmission control signal that is fed back from a user terminal, or may be configured to change the value of β when a plurality of retransmission control signals of the same content are received in a row. Also, as a basis for changing the value of β, the number of ACKs that continue and the number of NACKs that continue may be made different. For example, the number of times ACKs are received in a row, which serves as a basis for changing β, may be made greater than the number of times NACKs are received in a row.

Also, the radio base station may re-set the initial value of β and/or the range of variation of β (Δβ) taking into account the tendency of retransmission control signals fed back from a user terminal.

In this way, by allowing a radio base station to update $CQI_{JT}$ information using a calculating formula in which each cell's CQI and a variable which changes its value depending on the results of retransmission control signals are defined, even when the information is not applied to the updating of $CQI_{JT}$ information, it is still possible to reduce the influence of phase differences between cells. By this means, the radio base station is able to update $CQI_{JT}$ information more accurately, and prevent the decrease of throughput. In particular, by applying the present embodiment, even when the aggregated value ($CQI_{aggregated}$) of each cell's CQI is not fed back from a user terminal, it is still possible to calculate and update $CQI_{JT}$ information more accurately in a radio base station.

(Coherent JT)

When coherent JT-type CoMP is applied, a user terminal reports phase difference information between cells (θ), in addition to each cell's CQI (for example, CQI 1 and CQI 2), to a radio base station. On the other hand, the radio base station re-calculates $CQI_{JT}$ based on each cell's CQI and phase difference information (θ), and also updates the $CQI_{JT}$ information.

When determining the phase difference information (θ) to feed back to the radio base station in the user terminal, the user terminal selects specific phase differences such that the aggregated value ($CQI_{aggregated}$) of each cell's CQI is maximized. However, as described above, even when phase difference information (θ) to maximize the aggregated value ($CQI_{aggregated}$) of each cell's CQI is determined and fed back, cases still might occur where this is not accurately reflected in the calculation of $CQI_{JT}$ in the radio base station.

So, the user terminal according to the present embodiment determines phase difference information (θ) taking into account not only (1) the maximum value of the aggregated value ($CQI_{aggregated}$) of each cell's CQI, but also taking into account (2) the calculation of $CQI_{JT}$ (updated value ($CQI_{Update}$)). To be more specific, the user terminal is able to determine phase difference information (θ) in the following two steps.

(First Step)

A user terminal selects a plurality of phase differences (phase difference candidate values) based on the aggregated value ($CQI_{aggregated}$) of each cell's CQI and the updated value ($CQI_{Update}$) of $CQI_{JT}$ in the radio base station. To be more specific, the user terminal finds the difference between the aggregated value ($CQI_{aggregated}$) of CQI and $CQI_{JT}$ for CoMP (updated value ($CQI_{Update}$)), with respect to each of a plurality of phase differences. The updated value ($CQI_{Update}$) can be calculated in the same way as in the radio base station. Then, from the plurality of phase differences (phase difference candidate values), the user terminal selects phase differences that make the absolute value of the difference less than a predetermined value (here, X dB). For example, the user terminal selects candidate values for phase difference information using following equation 4.

[Formula 4]

$$\Omega = |CQI^{(i)}_{aggregated} - CQI^{(i)}_{JT}| < XdB,$$

$$0 < i < 2^B,$$ (Equation 4)

B: the number of phase feedback bits

Note that as for $CQI_{JT}$ for CoMP ($CQI_{Update}$), a configuration to apply, in the user terminal, the equation (see following equation 6) that is used to calculate $CQI_{JT}$ in the radio base station is possible. Also, when the equation that is actually applied in the radio base station has a variable that changes the value with retransmission control signals, a different equation (for example, an equation in which the variable is made a fixed value) from the equation that is actually applied in the radio base station may be applied.

Also, when the user terminal determines phase difference information (θ), a method whereby a plurality of candidate values ($θ_i$) for phase differences (for example, $θ_i = πi/2$, i=0, 1, 2, 3) are set in advance, and the user terminal selects specific phase difference candidate values from the plurality of phase difference candidate values based on the measurement value, may be possible. When this method is applied, it is possible to reduce the number of bits of the phase difference information to feed back (here, two bits). In this case, the user terminal may select phase difference candidates to make the absolute value of the difference value between the aggregated value ($CQI_{aggregated}$) of CQI and $CQI_{JT}$ for CoMP ($CQI_{Update}$) calculated in the radio base station less than a predetermined value, from a plurality of phase difference candidate values that can be selected for feedback.

(Second Step)

Next, the user terminal determines specific phase difference information (phase difference candidate value) that maximizes the aggregated value ($CQI_{aggregated}$) of CQI from a plurality of phase difference candidate values selected in the first step (see following equation 5).

[Formula 5]

$$θ = \arg\max\{CQI^{(i)}_{aggregated}\}, i \in \Omega$$ (Equation 5)

The user terminal feeds back the specific phase difference information determined in the above second step to the radio base station.

Based on the CQI of each cell (here, CQI 1 and CQI 2) and phase difference information (θ) fed back form the user terminal, the radio base station calculates $CQI_{JT}$ and also updates the $CQI_{JT}$ information. For example, the radio base station is able to re-calculate $CQI_{JT}$ using following equation 6.

[Formula 6]

$$CQI_{JT} = CQI1 + CQI2 + β*\sqrt{CQI1*CQI2}*\cos(θ)$$ (Equation 6)

CQI 1: received quality information in the CoMP cell where received power is the strongest;

CQI 2: received quality information in the CoMP cell where received power is the second strongest;

β: fixed value or variable; and

θ: phase difference information.

In above equation 6, β may be made a fixed value (for example, 2). In this case, the user terminal may apply above equation 6 (in which β is a fixed value (for example, 2)) to the calculation of $CQI_{JT}$ ($CQI_{Update}$) in the above first step.

Also, in above equation 6, it is possible to make one or both of β and cos (θ) a variable that changes depending on the result of the retransmission control signal (ACK/NACK) reported from the user terminal. For example, it may be possible to make β a fixed value (for example, 2) and update the value of cos (θ) in accordance with the result of the retransmission control signal, apply a value that is fed back from the UE as θ and also update the value of β, or update the values of β and cos (θ) in accordance with the result of the retransmission control signal. Also, a method to multiply the entire right-side part of the above equation by the variable β is also possible.

In this case, when a retransmission control signal that is fed back from the user terminal is an "ACK," the radio base station raises (or maintains) the value of one or both of β and cos (θ). Meanwhile, when a retransmission control signal fed back from the user terminal is a "NACK," the radio base station may lower the value of one or both of β and cos (θ).

Note that the initial value, interval and so on of β may be set in the same way as in above non-coherent JT-type CoMP. Also, as for cos (θ), too, the range of variation and so on may be set as appropriate.

Now, an example of the method of determining phase difference information in UE and updating $CQI_{JT}$ information in a radio base station when coherent JT-type CoMP is applied, will be described in detail with reference to FIG. 3 and FIG. 4. Note that the following description assumes a case where CoMP is applied using two cells. Also, a case is shown here where, as phase difference information to feed back to a radio base station, a user terminal selects one piece of phase difference information from candidate values of four kinds of (two bits of) phase differences ($\theta i = \pi i/2$, $i=0, 1, 2, 3$).

Figure 3:
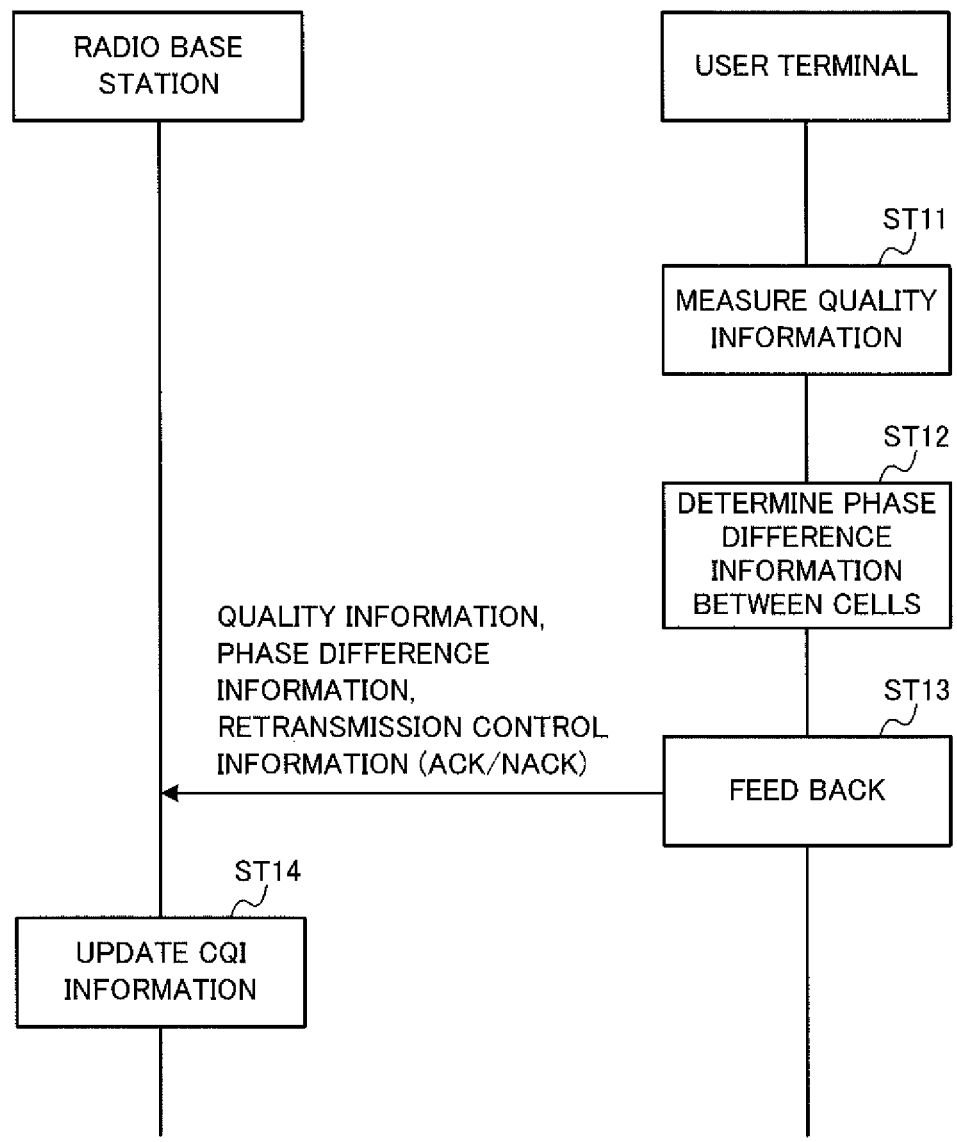
FIG. 3 is a sequence diagram to show an example of steps between a radio base station and a user terminal when coherent JT-type CoMP is applied.

First, the user terminal generates the CQI of each CoMP cell (CQI 1 and CQI 2) (ST11 in FIG. 3). To be more specific, based on the information shown in FIG. 4A, the user terminal calculates each cell's CQI (CQI 1 and CQI 2), the aggregated values ($CQI_{aggregated}$) of CQI, and the updated value ($CQI_{Update}$) of CoMP $CQI_{JT}$ corresponding to four kinds of phase differences. FIG. 4A shows $H_1$ and $H_2$, which represent the channel matrices of serving points (or coordinated points) with respect to the user terminal, $W_1$ and $W_2$, which represent the precoders of the serving points (or coordinated points), and the total value ($ICI+N_0$) of interference outside the CoMP coordinated cells and noise.

The user terminal is able to calculate each cell's CQI (CQI 1 and CQI 2) with following equation 7, calculate the aggregated value ($CQI_{aggregated}$) of CQI with following equation 8, and calculate the updated value ($CQI_{Update}$) of CQI with following equation 9. Note that the expressions of CQI 1 and CQI 2 in equation 7 are equally applicable to CQI 1 and CQI 2 of other equations in this description.

[Formula 7]

$$CQI1 = \frac{|H_1 W_1|^2}{ICI + N_0}, CQI2 = \frac{|H_2 W_2|^2}{ICI + N_0} \quad \text{(Equation 7)}$$

[Formula 8]

$$CQI_{Aggre.}^{(i)} = \frac{|H_1 W_1 + H_2 W_2 e^{j\theta i}|^2}{ICI + N_0} \quad \text{(Equation 8)}$$

phase $\alpha_i = e^{j\theta i}$, $j = \sqrt{-1}$

[Formula 9]

$$CQI_{Update}^{(i)} = CQI1 + CQI2 + 2 * \sqrt{CQI1 * CQI2} * \cos(\theta_i) \quad \text{(Equation 9)}$$

FIG. 4B shows CQI 1 and CQI 2, and the aggregated values ($CQI_{aggregated}$) of CQI and the updated values ($CQI_{Update}$) of $CQI_{JT}$ corresponding to each phase difference candidate value, calculated in above equations 7 to 9. Following this, the user terminal determines the specific phase difference information to feed back to the radio base station from a plurality of phase difference information candidate values, based on FIG. 4B (ST 12 in FIG. 3).

Here, if phase difference information is selected considering only the aggregated value ($CQI_{aggregated}$) of CQI as done heretofore, the user terminal selects phase difference information ($\theta_2$) with which the aggregated value ($CQI_{aggregated}$) of CQI is maximized (18). However, when the phase difference information to feed back to the radio base station is $\theta_2$, the updated value, ($CQI_{Update}$) of $CQI_{JT}$ in the radio base station becomes lower. That is, the difference between the aggregated value ($CQI_{aggregated}$) and the updated value ($CQI_{Update}$) increases. In this case, the CQI that is updated in the radio base station becomes inaccurate, and therefore there is a threat of lowered throughput if the radio base station executes radio communication control based on this updated value ($CQI_{Update}$).

Here, with the present embodiment, a user terminal first selects candidate values for phase difference information that make the absolute value of the difference between the aggregated value ($CQI_{aggregated}$) of CQI and the updated value ($CQI_{Update}$) less than a predetermined value (X dB) (first step). Note that X may be set taking into account the relationship between the accuracy of the updated value ($CQI_{Update}$) of $CQI_{JT}$ and throughput. Following this, from these candidate values of phase difference information selected, the user terminal selects the specific phase difference information that maximizes the aggregated value ($CQI_{aggregated}$) of CQI (second step).

Here, the user terminal selects phase difference information ($\theta_1$) and ($\theta_3$) that make the absolute value of the difference between the aggregated value ($CQI_{aggregated}$) of CQI and the updated value ($CQI_{Update}$) small (see above equation 4). Following this, the user terminal selects the phase difference information that maximizes the aggregated value ($CQI_{aggregated}$) of CQI, from the phase difference information ($\theta_1$) and ($\theta_3$) (see above equation 5). Here, the aggregated value ($CQI_{aggregated}$) of CQI is the same between the phase difference information ($\theta_1$) and ($\theta_3$), so that either one of the phase difference information ($\theta_1$) and ($\theta_3$) may be selected.

Next, the user terminal feeds back the phase difference information (either one of $\theta_1$ and $\theta_3$) and so on to the radio base station (ST13 in FIG. 3). Also, the user terminal feeds back a retransmission control signal, which shows whether or not data has been received successfully from the radio base station, to the radio base station.

The radio base station calculates $CQI_{JT}$ and updates the $CQI_{JT}$ information, based on each cell's CQI 1 and CQI 2, and phase difference information (one of $\theta_1$ and $\theta_3$) (ST14 of FIG. 3). Note that $CQI_{JT}$ may be calculated in the radio base station using above equation 6 and so on.

In this way, with the present embodiment, the user terminal determines the phase difference information to feed back taking into account the updated value ($CQI_{Update}$) of $CQI_{JT}$, so that the radio base station is able to improve the accuracy of CQI to update, and improve throughput.

(Configuration of Radio Communication System)

Figure 5:
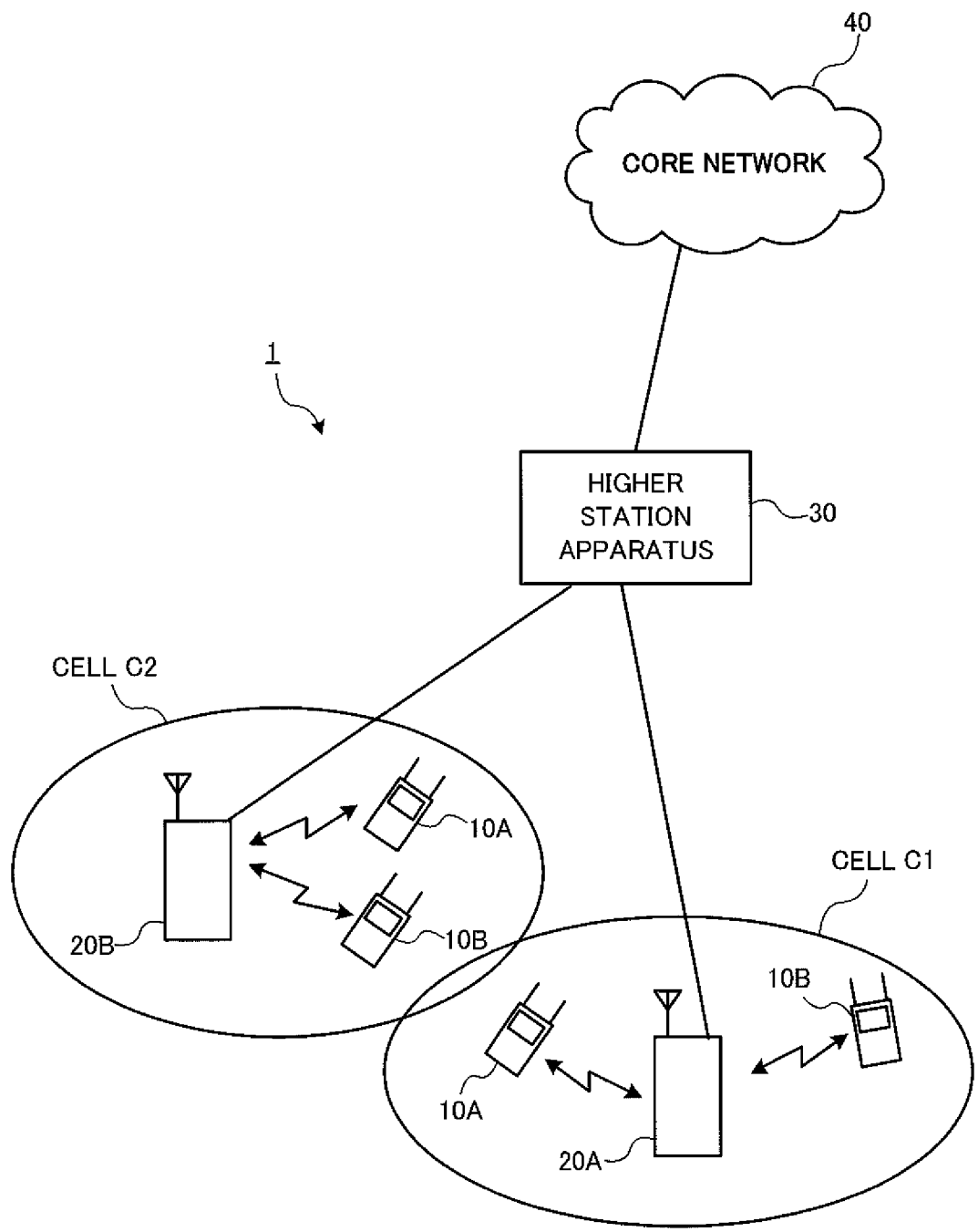
FIG. 5 is a diagram to explain a system configuration of a radio communication system.

Now, a radio communication system according to an embodiment of the present invention will be described in detail. FIG. 5 is a diagram to explain a system configuration of a radio communication system according to the present embodiment. Note that the radio communication system shown in FIG. 5 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 5, the radio communication system 1 is configured to include radio base stations 20A and 20B, and a plurality of first and second user terminals 10A and 10B that communicate with these radio base stations 20A and 20B. The radio base stations 20A and 20B are connected with a higher station apparatus 30, and this higher station apparatus 30 is connected with a core network 40. Also, the radio base stations 20A and 20B are connected with each other by wire connection or by wireless connection. The first and second user terminals 10A and 10B are able to communicate with the radio base stations 20A and 20B in cells C1 and C2. Note that the higher station apparatus 30 may be, for example, an access gateway apparatus, a radio network controller (RNC), a mobility management entity (MME) and so on, but is by no means limited to these. Also, between cells, when necessary, COMP transmission is controlled by a plurality of base stations.

Although the first and second user terminals 10A and 10B may be either LTE terminals or LTE-A terminals, the following description will be given simply with respect to the first and second user terminals, unless specified otherwise. Also, although the first and second user terminals 10A and 10B will be described to perform radio communication with the radio base stations 20A and 20B, for ease of explanation, more generally, user equipment (UE) including both mobile terminal apparatuses and fixed terminal apparatuses may be used as well.

In the radio communication system 1, as radio access schemes, OFDMA (Orthogonal Frequency Division Multiple Access) is applied to the downlink and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH (Physical Downlink Shared Channel), which is a downlink data channel used by the first and second user terminals 10A and 10B on a shared basis, and downlink L1/L2 control channels (PDCCH, PCFICH, PHICH). Transmission data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is an uplink data channel used by each user terminal on a shared basis, and a PUCCH (Physical Uplink Control Channel), which is an uplink control channel. By means of this PUSCH, transmission data and higher control information are transmitted. Furthermore, the PUCCH transmits downlink received quality information (CQI), ACK/NACK, and so on.

Now, an overall configuration of a radio base station according to the present embodiment will be explained with reference to FIG. 6. Note that the radio base stations 20A and 20B have the same configuration and therefore hereinafter will be described simply as "radio base station 20." Also, the first and second user terminals 10A and 10B, which will be described later, also have the same configuration and therefore hereinafter will be described simply as "user terminal 10."

The radio base station 20 includes transmitting/receiving antennas 201, amplifying sections 202, transmitting/receiving sections (reporting sections) 203, a baseband signal processing section 204, a call processing section 205, and a transmission path interface 206. Transmission data to be transmitted from the radio base station 20 to the user terminal on the downlink is input from the higher station apparatus 30 into the baseband signal processing section 204 via the transmission path interface 206.

In the baseband signal processing section 204, a downlink data channel signal is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding, an inverse fast Fourier transform and so on.

Also, the baseband signal processing section 204 reports control information for allowing each user terminal 10 to perform radio communication with the radio base station 20, to the user terminals 10 connected to the same cell, through a broadcast channel. The information for allowing communication in the cell includes, for example, the uplink or downlink system bandwidth, root sequence identification information (root sequence index) for generating random access preamble signals in the PRACH (Physical Random Access Channel), and so on.

The baseband signal that is output from the baseband signal processing section 204 is converted into a radio frequency band in the transmitting/receiving sections 203. The amplifying sections 202 amplify the radio frequency signals having been subjected to frequency conversion, and output the results to the transmitting/receiving antennas 201. Note that the transmitting/receiving sections 203 constitute a receiving means to receive uplink signals including information about phase differences between a plurality of cells and PMIs, and a transmitting means to transmit transmission signals by coordinated multiple-point transmission. Also, the transmitting/receiving sections 203 also function as a reporting section when the radio base station reports inter-cell CSI candidate values to the user terminal.

Meanwhile, as for signals to be transmitted from the user terminal 10 to the radio base station 20 on the uplink, radio frequency signals that are received in the transmitting/receiving antennas 201 are each amplified in the amplifying sections 202, converted into baseband signals through frequency conversion in the transmitting/receiving sections 203, and input in the baseband signal processing section 204.

The baseband signal processing section 204 performs, for the transmission data included in the baseband signal received on the uplink, an FFT process, an IDFT process, error correction decoding, a MAC retransmission control receiving process, and RLC layer and PDCP layer receiving processes. The decoded signals are transferred to the higher station apparatus 30 through the transmission path interface 206.

The call processing section 205 performs call processing such as setting up and releasing communication channels, manages the state of the radio base station 20 and manages the radio resources.

Figure 6:
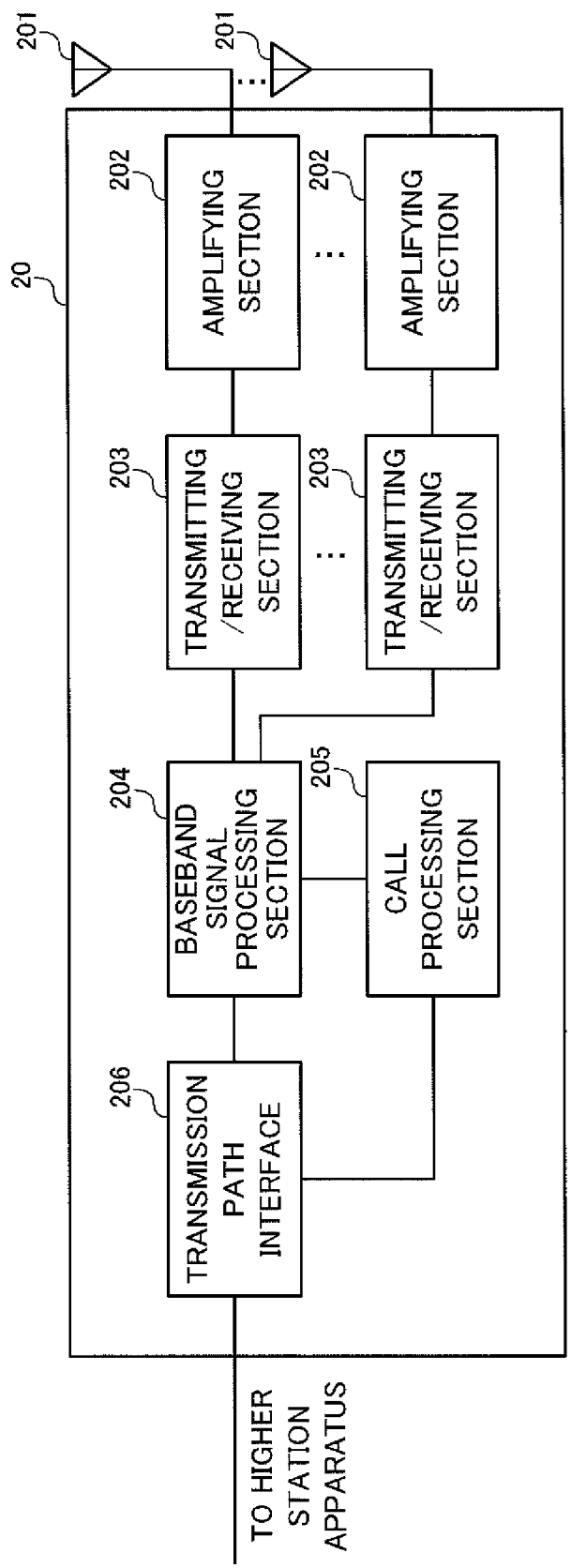
FIG. 6 is a diagram to explain an overall configuration of a radio base station.
Figure 7:
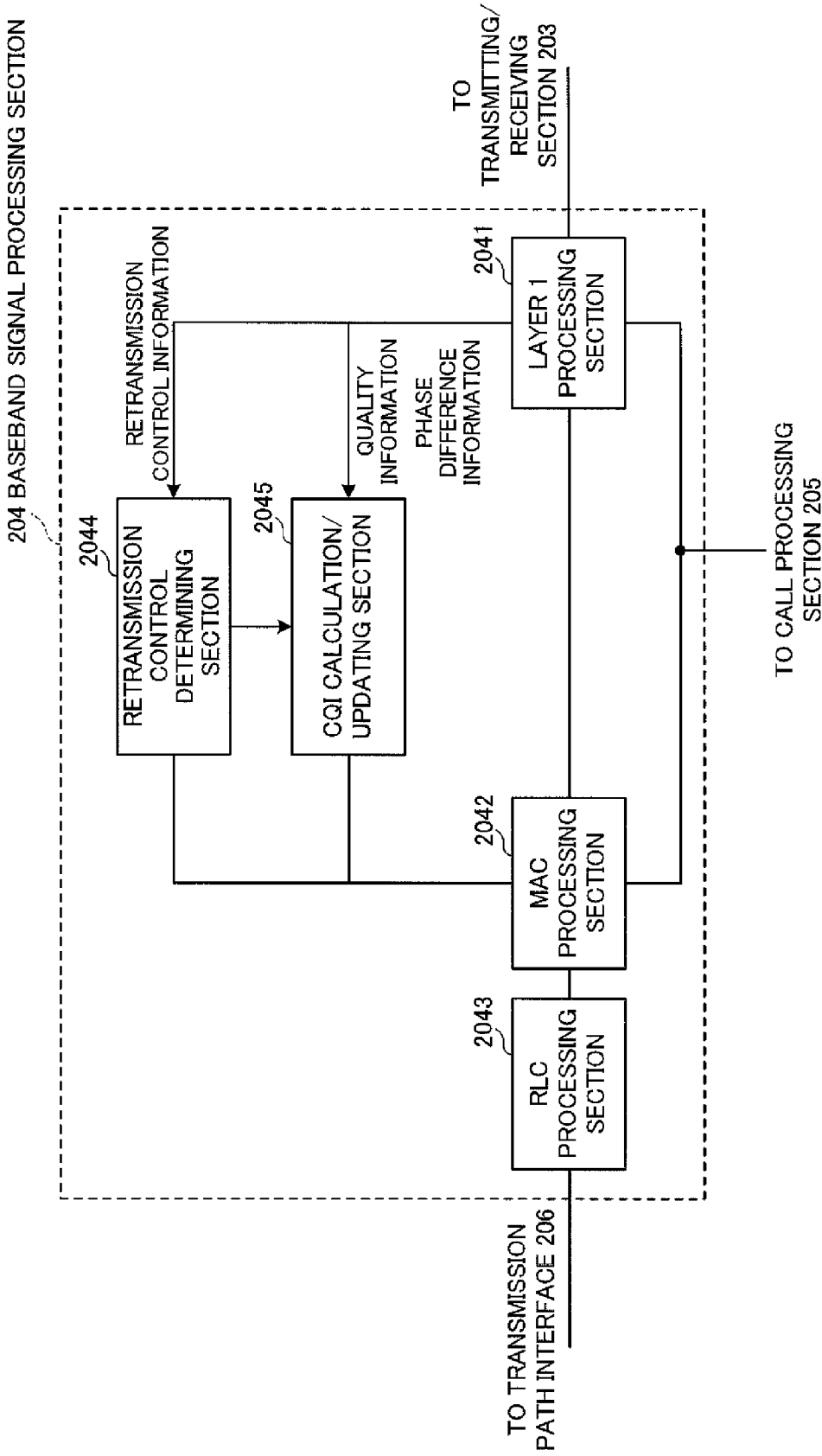
FIG. 7 is a functional block diagram corresponding to a baseband processing section in a radio base station.

FIG. 7 is a block diagram showing a configuration of a baseband signal processing section in the radio base station shown in FIG. 6. The baseband signal processing section 204 is primarily formed with a layer 1 processing section 2041, a MAC processing section 2042, an RLC processing section 2043, a retransmission control determining section 2044, and a CQI calculation/updating section 2045.

The layer 1 processing section 2041 mainly performs processes related to the physical layer. The layer 1 processing section 2041 performs processes for a signal received on the uplink, including, for example, channel decoding, a discrete Fourier transform (DFT), frequency demapping, an inverse fast Fourier transform (IFFT), data demodulation, and so on. Also, the layer 1 processing section 2041 performs processes for a signal to transmit on the downlink, including channel coding, data modulation, frequency mapping, an inverse fast Fourier transform (IFFT) and so on.

The MAC processing section 2042 performs processes for a signal received on the uplink, including MAC layer retransmission control, scheduling for the uplink/downlink, transport format selection for the PUSCH/PDSCH, resource block selection for the PUSCH/PDSCH and so on.

The RLC processing section 2043 performs, for a packet that is received on the uplink/a packet to transmit on the downlink, packet division, packet combining, RLC layer retransmission control and so on.

The retransmission control determining section 2044 detects a retransmission control signals fed back from a user terminal (ACK/NACK). When the feedback information is an ACK, the retransmission control determining section 2044 decides that the user terminal has received the signal adequately, and, when the feedback information is a NACK, the retransmission control determining section 2044 decides that the user terminal has failed to receive the signal, and retransmits the same signal to the user terminal. Also, the result decided in the retransmission control determining section 2044 is output to the CQI calculation/updating section 2045.

Based on each cell's CQI (for example, CQI 1 and CQI 2), the CQI calculation/updating section 2045 calculates $CQI_{JT}$ and updates the $CQI_{JT}$ information. For example, when non-coherent JT-type CoMP is applied, the radio base station re-calculates and updates $CQI_{JT}$ using an algorithm in which CQI 1 and CQI 2 of the cells and a variable which changes the value in accordance with the content of the retransmission control signal output from the retransmission control determining section 2044 are defined. For example, the radio base station recalculates and updates $CQI_{JT}$ using above equation 3.

Also, when coherent JT-type CoMP is applied, the radio base station re-calculates and updates $CQI_{JT}$ based on CQI 1 and CQI 2 of the cells and phase difference information (θ). For example, the radio base station re-calculates and updates $CQI_{JT}$ using above equation 6.

Next, an overall configuration of a user terminal according to the present embodiment will be described with reference to FIG. 8. An LTE terminal and an LTE-A terminal have the same hardware configurations in principle parts, and therefore will be described indiscriminately. A user terminal 10 has transmitting/receiving antennas 101, amplifying sections 102, transmitting/receiving sections (receiving sections) 103, a baseband signal processing section 104, and an application section 105.

As for downlink data, radio frequency signals that are received in the transmitting/receiving antennas 101 are amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101. Note that the transmitting/receiving sections 103 constitute a transmitting means to transmit information about phase differences, information about the connecting cells, selected PMIs and so on to the radio base station eNBs of a plurality of cells, and a receiving means to receive downlink signals.

Figure 8:
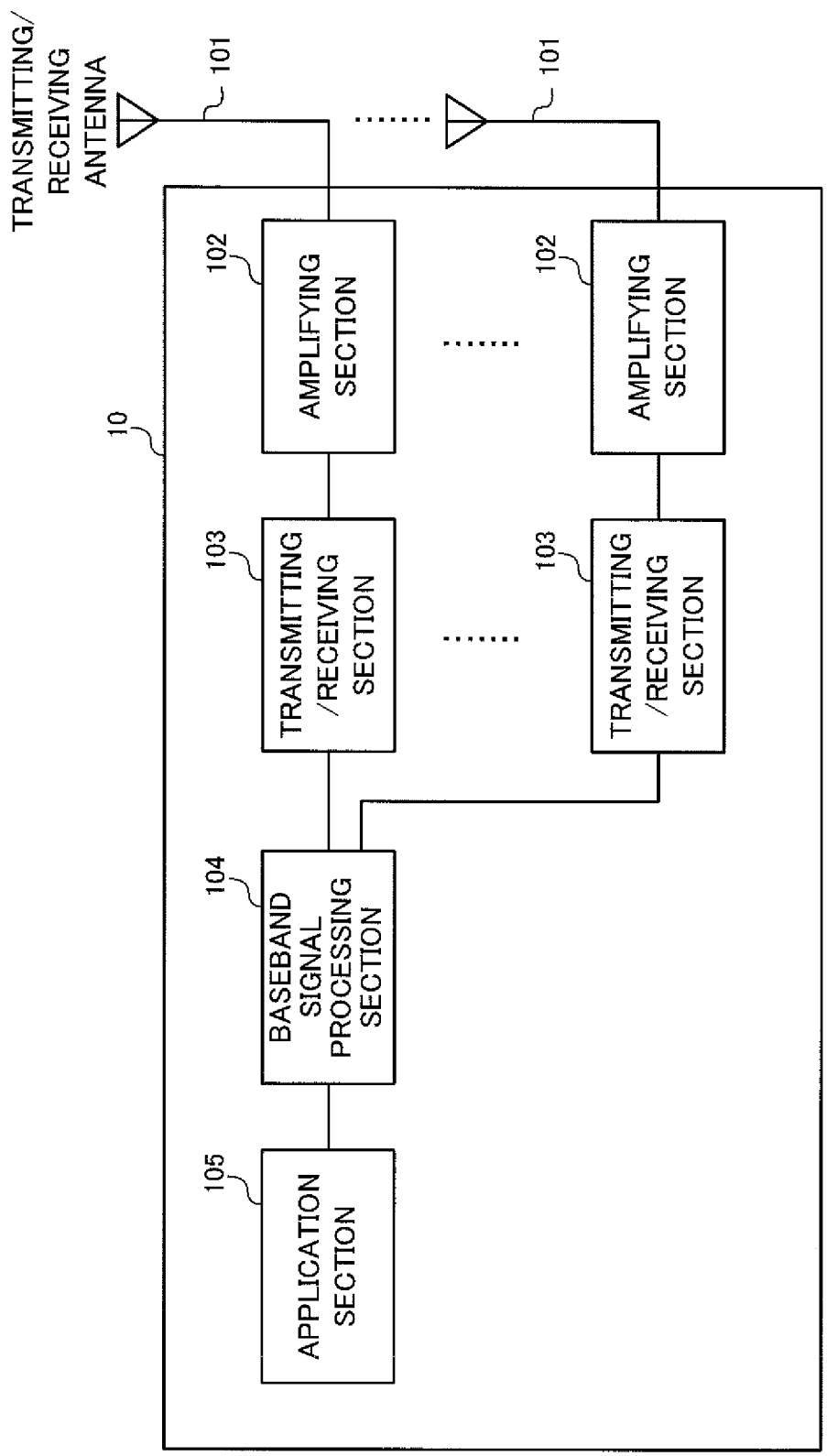
FIG. 8 is a diagram to explain an overall configuration of a user terminal.
Figure 9:
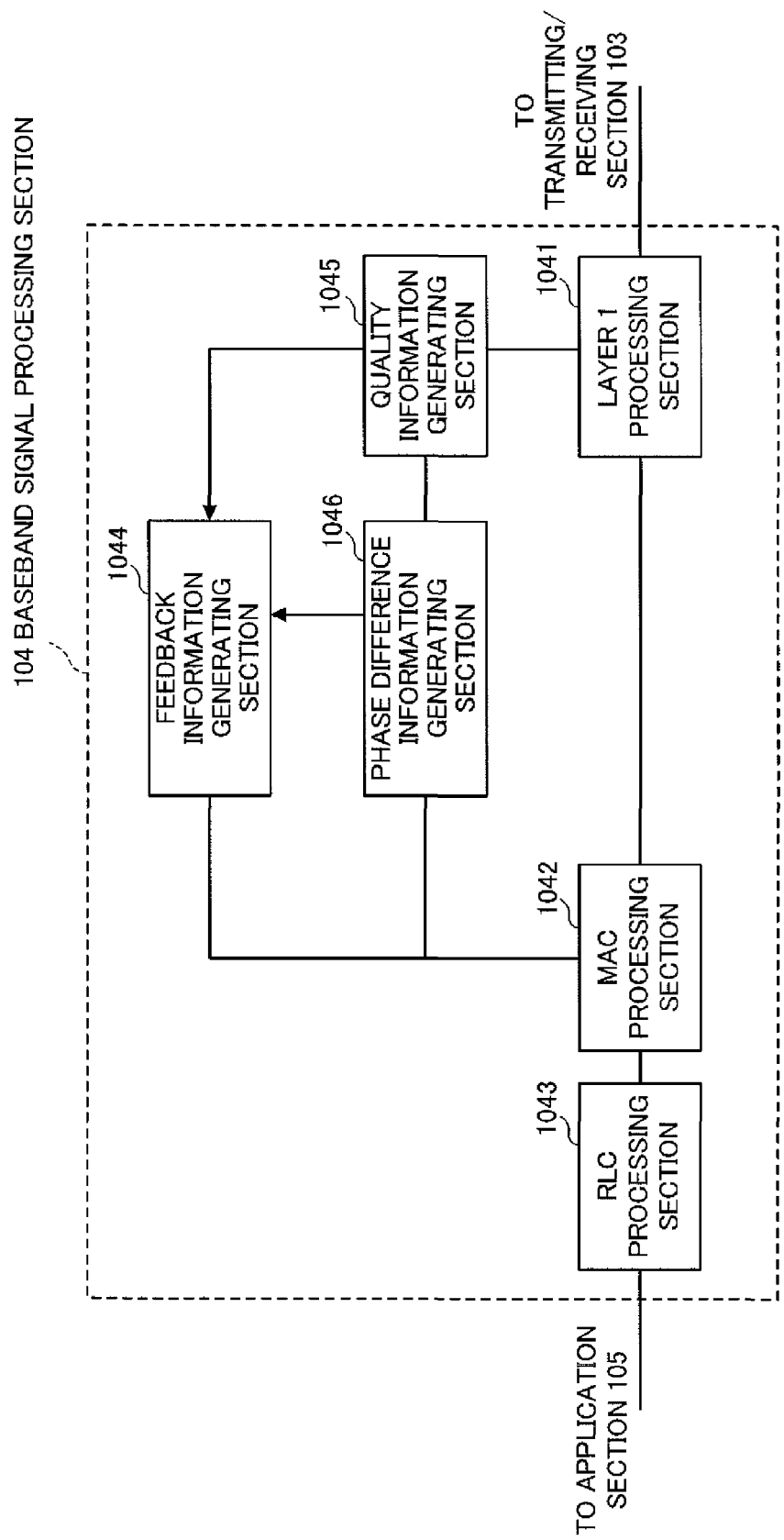
FIG. 9 is a functional block diagram corresponding to a baseband processing section in a user terminal.

FIG. 9 is a block diagram showing a configuration of a baseband signal processing section in the user terminal shown in FIG. 8. The baseband signal processing section 104 is primarily formed with a layer 1 processing section 1041, a MAC processing section 1042, an RLC processing section 1043, a feedback information generating section 1044, a quality information generating section 1045, and a phase difference information generating section 1046.

The layer 1 processing section 1041 mainly performs processes related to the physical layer. The layer 1 processing section 1041 performs processes for a signal that is received on the downlink, including, for example, channel decoding, a discrete Fourier transform (DFT), frequency demapping, an inverse fast Fourier transform (IFFT), data demodulation and so on. Also, the layer 1 processing section 1041 performs processes for a signal to transmit on the uplink, including channel coding, data modulation, frequency mapping, an inverse fast Fourier transform (IFFT), and so on.

The MAC processing section 1042 performs, for a signal that is received on the downlink, MAC layer retransmission control (HARQ), an analysis of downlink scheduling information (specifying the PDSCH transport format and specifying the PDSCH resource blocks), and so on. Also, the MAC processing section 1042 performs processes for a signal to transmit on the uplink, such as MAC retransmission control, an analysis of uplink scheduling information (specifying the PUSCH transport format and specifying the PUSCH resource blocks), and so on.

The RLC processing section 1043 performs, for a packet received on the downlink/a packet to transmit on the uplink, packet division, packet combining, RLC layer retransmission control and so on.

The quality information generating section 1045 generates quality information (for example, CQI 1 and CQI 2) in each cell. The measurement values of quality information measured with respect to each cell are output to the feedback information generating section 1044 and the phase difference information generating section 1046.

The phase difference information generating section 1046 generates phase difference information between cells where CoMP is applied. When coherent JT-type CoMP is applied, the user terminal determines the phase difference information taking into account the updated value (CQI$_{Update}$) of CQI$_{JT}$ in the radio base station and the maximum value of the aggregated value (CQI$_{aggregated}$) of each cell's CQI. Note that the updated value (CQI$_{Update}$) and (CQI$_{aggregated}$) then can be calculated in the quality information generating section 1045 or in the phase difference information generating section 1046 based on each cell's CQI.

To be more specific, the user terminal first selects phase difference information that makes the absolute value of the difference between the aggregated value (CQI$_{aggregated}$) of each cell's CQI and the updated value (CQI$_{Update}$) smaller than a predetermined value (X dB) (first step). Following this, the user terminal selects the specific phase difference information that maximizes the aggregated value (CQI$_{aggregated}$) of CQI, from the selected phase difference information (second step). The specific phase difference information determined in the phase difference information generating section 1046 is output to the feedback information generating section 1044.

The feedback information generating section 1044 generates feedback information (CSI). As CSI, there are cell-specific CSI (PMI, CDI, CQI), phase difference information, RI (Rank Indicator) and so on. Also, the feedback information generating section 1044 generates retransmission control signals (ACK/NACK), which show whether or not the user terminal has adequately received the data signal. These signals generated in the feedback control information generating section 1044 are fed back to the radio base station through the PUCCH and the PUSCH.

When non-coherent JT-type CoMP is applied, the retransmission control determining section 2044 of the radio base station decides whether or not the user terminal has received data adequately (ACK/NACK) based on the retransmission control signal that is fed back from the user terminal. Also, the CQI calculation/updating section 2045 of the base station calculates CQI$_{JT}$ based on each cell's CQI and updates the CQI$_{JT}$ information. At this time, the radio base station is able to update CQI$_{JT}$ using a calculating formula (for example, above equation 3) that includes a variable that change the value in accordance with the result of the retransmission control signal.

Also, when coherent JT-type CoMP is applied, the user terminal feeds back the phase difference information generated in the phase difference information generating section 1046 to the radio base station. The CQI calculation/updating section 2045 of the radio base station updates CQI$_{JT}$ based on each cell's CQI and phase difference information. Also, at this time, it is equally possible to update CQI$_{JT}$ using a calculating formula (for example, above equation 6) that includes β and/or cos (θ) that change the value in accordance with the result output from the retransmission control determining section 2044.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-060788, filed on Mar. 16, 2012, including the specification, drawings, and abstract, is incorporated herein by reference in its entirety.

The invention claimed is:

1. A radio base station that is configured to be able to perform coordinated multiple-point transmission/reception with a user terminal, the radio base station comprising:
    a detection section configured to detect a retransmission control signal fed back from the user terminal; and
    a CQI updating section configured to update a CQI for coordinated multiple-point transmission/reception using received quality information in each cell,
    wherein the CQI updating section updates the CQI using a calculating formula that is defined with the received quality information in each cell and a variable which changes a value depending on content of the retransmission control signal.

2. The radio base station according to claim 1, wherein the CQI updating section applies the following equation 11, in which β, which changes a value depending on the content of the retransmission control signal, is defined, as the calculating formula:

[Formula 10]

$$CQI_{JT}=CQI1+CQI2+\beta*\sqrt{CQI1*CQI2} \qquad \text{(Equation 11)}$$

where:
    CQI 1 is received quality information in a CoMP cell where received power is the strongest;
    CQI 2 is received quality information in a CoMP cell where received power is the second strongest; and
    β is the variable.

3. The radio base station according to claim 2, wherein the CQI updating section raises the value of the variable β when the retransmission control signal is an ACK and lowers the value of the variable β when the retransmission control signal is a NACK.

4. A radio base station that is configured to be able to perform coordinated multiple-point transmission/reception with a user terminal, the radio base station comprising:
    a detection section configured to detect a retransmission control signal fed back from the user terminal; and
    a CQI updating section configured to update a CQI for coordinated multiple-point transmission/reception using received quality information in each cell and phase difference information that is fed back from the user terminal,
    wherein the phase difference information is determined in the user terminal taking into account a difference value between an aggregated value (CQI$_{aggregated}$) of received quality in each cell, and an updated value (CQI$_{Update}$) of the CQI for coordinated multiple-point transmission/reception.

5. The radio base station according to claim 4, wherein the CQI updating section applies the following equation 12:

[Formula 11]

$$CQI_{JT}=CQI1+CQI2+\beta*\sqrt{CQI1*CQI2}*\cos(\theta) \qquad \text{(Equation 12)}$$

where:
    CQI 1 is received quality information in a CoMP cell where received power is the strongest;
    CQI 2 is received quality information in a CoMP cell where received power is the second strongest;
    β is a fixed value or a variable; and
    θ is the phase difference information.

6. The radio base station according to claim 5, wherein the CQI updating section changes a value of one or both of β and cos (θ) in accordance with content of the retransmission control signal.

7. The radio base station according to claim 6, wherein the CQI updating section raises the value of one or both of β and cos (θ) when the retransmission control signal is an ACK, and lowers the value of one or both of β and cos (θ) when the retransmission control signal is a NACK.

8. A user terminal that is configured to be able to perform coordinated multiple-point transmission/reception with a plurality of radio base stations, the user terminal comprising:

a quality information generating section configured to generate received quality information in each cell;

a retransmission control signal generating section configured to decide whether or not a data signal that is transmitted from the radio base stations can be received, and generate a retransmission control signal;

a phase difference information generating section configured to generate phase difference information between cells; and a transmitting/receiving section configured to feed back at least the retransmission control signal and the phase difference information to the radio base stations, wherein the phase difference information generating section determines the phase difference information taking into account a difference value between an aggregated value ($CQI_{aggregated}$) of received quality of each cell and an updated value ($CQI_{Update}$) of a CQI for coordinated multiple-point transmission/reception.

9. The user terminal according to claim 8, wherein the phase difference information generating section selects a plurality of pieces of phase difference information that make an absolute value of a difference value between the aggregated value ($CQI_{aggregated}$) of received quality of each cell and the updated value ($CQI_{Update}$) of the CQI for coordinated multiple-point transmission/reception smaller than a predetermined value, and selects phase difference information which maximizes the aggregated value ($CQI_{aggregated}$) of received quality from the plurality of pieces of phase difference information selected.

10. A radio communication method for a plurality of radio base stations and a user terminal that is configured to be able to perform coordinated multiple-point transmission/reception with the plurality of radio base stations, the radio communication method comprising the steps of:

at the user terminal:
generating received quality information in each cell;
deciding whether or not a data signal that is transmitted from the radio base stations can be received, and generating a retransmission control signal; and
feeding back at least the retransmission control signal to the radio base stations; and at the radio base station:
detecting the retransmission control signal that is fed back;
updating a CQI for coordinated multiple-point transmission/reception using received quality information in each cell; and
updating the CQI using a calculating formula that is defined with the received quality information in each cell and a variable which changes a value depending on content of the retransmission control signal.

11. A radio communication system comprising a plurality of radio base stations and a user terminal that is configured to be able to perform coordinated multiple-point transmission/reception with the plurality of radio base stations, wherein:

the user terminal comprises:
a quality information generating section configured to generate received quality information in each cell;
a retransmission control signal generating section configured to decide whether or not a data signal that is transmitted from the radio base stations can be received, and generate a retransmission control signal; and
a transmitting/receiving section configured to feed back at least the retransmission control signal to the radio base stations; and the radio base station comprises:
a detection section configured to detect the retransmission control signal fed back from the user terminal; and
a CQI updating section configured to update a CQI for coordinated multiple-point transmission/reception using the received quality information in each cell, wherein the CQI updating section updates the CQI using a calculating formula that is defined with the received quality information in each cell and a variable which changes a value depending on content of the retransmission control signal.

* * * * *